Sept. 7, 1965  H. E. ROBSON ETAL  3,205,066
FLUID BED PROCESS FOR REDUCING IRON OXIDES
Filed Feb. 20, 1963
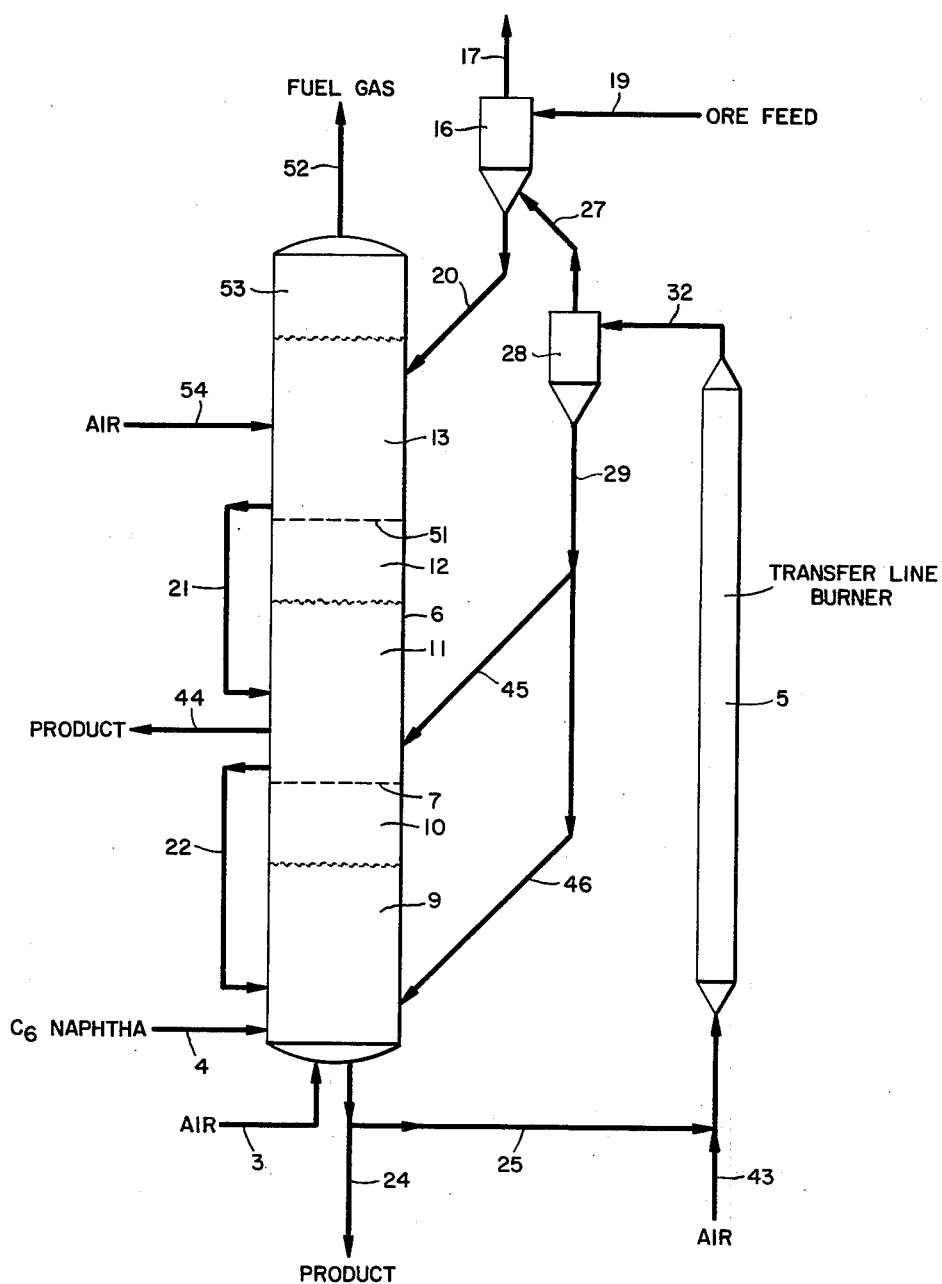
Harry Edwin Robson
Lindsay I. Griffin, Jr.   Inventors
By *Perry Carvellas*
Patent Attorney

3,205,066
FLUID BED PROCESS FOR REDUCING IRON OXIDES

Harry Edwin Robson, Baton Rouge, La., and Lindsay I. Griffin, Jr., Summit, N.J., assignors to Esso Research and Engineering Company, a corporation of Delaware
Filed Feb. 20, 1963, Ser. No. 259,856
15 Claims. (Cl. 75—26)

The present invention relates to an improved process for producing metallic iron from iron ore. More particularly, the present invention relates to a method of direct iron ore reduction utilizing hydrocarbons to reduce the iron ore. Specifically, the present invention relates to a process of direct iron ore reduction in a fluidized bed reactor which comprises direct injection of hydrocarbons and an oxygen-containing gas into a bed containing reduced iron ore whereby the hydrocarbons are partially oxidized and are cracked and carbon is deposited on the reduced iron.

Hydrocarbon cracking and iron ore reducing reactions are highly endothermic and heat must be supplied to carry out these reactions. The necessary heat is supplied by carrying out the cracking or gasification reaction under conditions whereby excess carbon is deposited on the redued iron, and the reduced iron plus carbon is cycled to an external burner where a portion of the excess carbon is exothermically burned with an oxygen-containing gas thereby heating the reduced iron particles, which heated particles are recycled to the reduction and gasification zones and supply the needed heat. The amount of oxygen-containing gas feed to the gasification zone is such that the production of $CO_2$ and $H_2O$ is kept at a minimum, carbon is deposited, and relatively little heat is generated by the cracking and partial oxidation of the hydrocarbon. The oxidation conditions in the burner are critical and are controlled so that a portion of the deposited carbon is selectively oxidized and the reduced iron is not back-oxidized while the iron is being heated to an elevated temperature and recycled to the reduction zone.

By performing the cracking and partial oxidation and reduction in separate reaction zones, and by producing the heat for these endothermic reactions in a different reaction zone by burning a portion of the deposited carbon from the reduced iron, each of the reactions may be carried out more efficiently and economically. In this manner conditions may be selected for each of the reaction zones which can best carry out the desired reactions.

Many efforts have been made to reduce iron ore in fluidized beds using hydrocarbons. Many difficulties have been encountered in bed bogging and sintering of the particles when operated at elevated temperatures. This usually results in loss of fluidization and inoperability of the process. In addition, in most of these processes the reducing gases have been primarily hydrogen and carbon monoxide made by the reforming of various hydrocarbon fuels. The reforming operation is both a troublesome and an uneconomic step due to the high cost of the reforming equipment and also to the excessive quantities of gases passing through the reduction equipment.

Probably the most important single reason for not using hydrocarbons to directly reduce the iron ore is found in the particularly poor thermal characteristics of the hydrocarbons as a reducing agent for oxidic iron ore. The prevailing reduction reactions involving such hydrocarbons are strongly endothermic and their rates become appreciable only at relatively high temperatures. In order to supply the heat required by these reactions and to maintain temperatures of these high levels in the reduction zone by preheating either the gas feed or the ore or both, prohibitively high preheating temperatures are required. If this heat is to be supplied from external source through the walls of the reduction zone, temperature gradients are undesirably high. If it is attempted to generate the heat within the reduction zone itself by using large amounts of air, the reactions must be carefully controlled so that the ratio of CO to $CO_2$ in the gas stays below the equilibrium value at the temperature employed of the oxidation reduction reactions of iron oxides in the presence of carbon oxides. When employing the ore in powdered form, particularly when using the fluid solids technique, high temperatures above 1800° F. must be avoided because such high temperatures have been found to be conducive to agglomeration of the particles probably as a result of plasticization of the solids, particularly the reduced iron itself.

When attempting to generate sufficient heat solely by partial combustion of hydrocarbons in contact with the ore and/or reduced metal in the reducing zone, other difficulties arise. For example, the oxidation of hydrocarbons merely to CO has only a rather insignificant positive heat effect so that when substantial amounts of heat are required, the methane consumption is excessive. Far more heat may be produced by burning the hydrocarbons all the way to $CO_2$ and water. However, only a limited amount of $CO_2$ may be tolerated in the ferrous reduction zone if the reoxidation of the metal is to be avoided. It is extremely difficult, therefore, to reconcile the requirements of efficient heat generation and reduction when using hydrocarbons both as the reducing and combustion supporting agent. It is difficult to utilize hydrocarbons as a source of reducing gases or as a reducing agent to reduce FeO to metallic iron and to supply heat in this zone by adding air to partially oxidize the hydrocarbons because of the danger of back-oxidation of the reduced iron to the iron oxides.

Attempts have been made to supply the necessary heat for the endothermic reactions by passing through this stage heated inert solid materials which are heated externally and transmit the heat to the reducing stage. However, utilization of inert solids cycle through the reduction stage has proved unsuccessful because of the difficulty in obtaining efficient separation of the inert solids from the reaction products which results in contamination of the metallic iron product with the inert solids. Further, there is some loss of heat efficiency in transmission of the heat from the solids to the ore, since the inert particles must differ in size and/or density to obtain any kind of separation from the material being heated.

The reducing off gases from the ferrous reduction zone can be partially oxidized with air to provide the heat for the endothermic reduction in the first stage of the reducing zone where the $Fe_2O_3$ is reduced to lower stages of oxidation. For example, in the $Fe_2O_3$ reduction to FeO under carefully controlled conditions, the reducing gases can be partially oxidized with air to provide the necessary heat for the reduction without oxidizing the iron ore. This is because at the higher stage of oxidation of the metal the danger of back-oxidation due to high $CO_2$ and/or $H_2O$ concentration is much less than in the zone containing the metallic iron.

Making reducing gases utilizing a separate gas generator to produce hydrogen or a mixture of carbon monoxide is very expensive, both from a standpoint of fuel requirements and equipment cost. One of the major cost items in iron ore reduction is the fuel needed to supply the heat for endothermic reactions, such as, cracking of the hydrocarbons and reduction of the iron oxides to metallic iron. Any process which efficiently utilizes the reducing gases and minimizes the fuel requirements and/or eliminates the need for a gas generator will constitute a substantial improvement in carrying out direct iron ore reduction.

Another problem involved in direct iron ore reduction processes is that the reduced metal is extremely pyrophoric and on contact with air will normally oxidize very rapidly. Further, since one of the main expenses of direct iron ore reduction is the price of the reducing gas, any means by which the reducing gas can be more efficiently utilized will reduce the cost of the operation.

In accordance with the present invention, direct injection of hydrocarbons is accomplished in a gasification zone and the heat for endothermic reactions is provided by an external transfer line heater. It has been found that the ideal heat transfer characteristics and mixing speed resulting in perfect uniformity of solids composition in all of the conditions throughout the system are obtained by carrying out the process in a series of dense fluidized beds of finely divided reduced iron and iron ore. This technique permits a successful maintenance of the critical conditions of heat generation, temperature and pressure, and the proper ratios of the gaseous reactants in the reaction products within the narrow ranges required to carry out the process. In carrying out the process in fluidized beds reaction zones, the flow of materials can be carefully controlled and the desired conditions maintained.

In accordance with one embodiment of the present invention, the iron ore is reduced in two stages; namely $Fe_2O_3$ to FeO and FeO to Fe; however, more than two stages can be used.

The most critical step in the process is in the gasification step carried out in the third zone in the presence of carbon coated reduced iron particles. Most of the sintering and agglomeration occurs when operating at elevated temperatures in this zone. In accordance with the present invention, these difficulties are prevented by depositing on the reduced iron a coating of carbon. After the iron oxide is reduced to metallic iron in the reducing zones, carbon is formed in the gasification zone and is deposited uniformly on the reduced iron forming a protective covering.

In the gasification zone containing Fe and carbon an oxygen-containing gas partially oxidizes the hydrocarbon feed and at the elevated temperatures existing in this zone the hydrocarbon is cracked. The reactions which are carried out in the gasification zone are as follows:

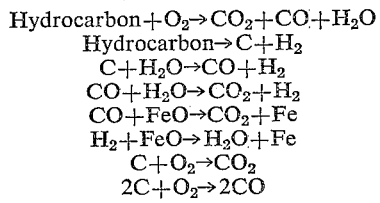

The degree to which a particular reaction is carried out and the amount of a particular product formed will depend on the reaction conditions, and the ratio of $O_2$ to carbon in oxidizing gas and in the hydrocarbon feed, respectively.

The rate of feeding the hydrocarbon and $O_2$ is set so as to maintain an atmosphere which is reducing to FeO and deposited carbon. The partial oxidation of the hydrocarbon is carried out to produce maximum amounts of CO and minimum amounts of $CO_2$ and $H_2O$. The over-all reaction is strongly endothermic and large amounts of heat must be added. The heat is added by circulating a part of the carbon coated reduced iron product to an external heater wherein a portion of the carbon coating is selectively burned with an oxygen-containing gas to heat the iron and carbon without back-oxidizing the reduced iron.

The gases generated by the partial oxidation and cracking of the hydrocarbon feed fed to the gasification zone comprise the reducing gases and the fluidizing gases for maintaining the reducing beds as dense fluidized beds. The gases produced comprise major amounts of CO and $H_2$ and minor amounts of $CO_2$ and $H_2O$.

The hot gases from the gasification zone blow upward to the FeO to Fe reducing zone wherein they provide heat for the reduction and are partially oxidized while reducing the iron oxide to metallic iron in this bed. The off gas from this zone flows upward to the $Fe_2O_3$ to FeO reducing zone wherein the gases are further oxidized while reducing the iron oxide in this bed to a lower state of oxidation. The off gas from the $Fe_2O_3$ zone is still relatively hot and can be used to preheat the ore feed, or may subsequently be burned as fuel.

The reducing reactions carried out in the $Fe_2O_3$ to FeO reducing zone are endothermic and heat is supplied to these zones by preheating the iron ore feed to the $Fe_2O_3$ reducing zone and also by the residual heat in the off gas from the FeO to Fe reducing zone. In addition, heat may be added to this zone; i.e., the $Fe_2O_3$ to FeO zone, by partially oxidizing some of the reducing gas by introducing an oxygen-containing gas into this zone, which selectively burns the reducing gas while maintaining an atmosphere which is still reducing to the iron oxide.

The major portion of heat necessary to preheat the ore feed to a high temperature can be provided by contacting the ore feed in a preheat cyclone or other suitable device with the off gas from the external burner. A substantial portion of the heat added to the FeO to Fe reducing zone can be added by circulating a portion of the heated carbon coated reduced iron particles from the transfer line heater to this zone. Most of the required heat is added to the gasification zone by recycling the major portion of the heated carbon coated reduced iron particles to this zone from the heater.

It is essential for the process of the invention that the ratio of $O_2$ to hydrocarbon fed to the gasification zone be so controlled that the ratio of CO to $CO_2$ and of $H_2$ to $H_2O$ in this zone will remain below that in which oxidation of the metal becomes prevalent while at the same time this ratio must be so adjusted so as to maintain an oxidizing potential adequately high to substantially reduce excessive carbon deposition from the cracking of the hydrocarbon feed. The amount of carbon deposited on the iron is critical to the extent that if excessive amounts of carbon are deposited, the reaction becomes more highly endothermic, requiring additional heat to be added to this zone to carry out the reaction, plus it represents a substantial heat loss and loss of reducing gases, thus increasing the fuel requirements to carry out the reduction step. Whereas, if the amount deposited is too little there will not be enough present to burn to generate the necessary heat and still leave enough to prevent back-oxidation of the reduced iron.

In a preferred embodiment of the present invention hydrocarbons are injected directly into a gasification zone in which zone the hydrocarbons are partially oxidized with air and are cracked, depositing carbon on the reduced iron and forming the reducing gases, which gases reduce the iron oxide to metallic iron in the reducing zones. The carbon cover on the reduced iron prevents back-oxidation, renders the iron product non-pyrophoric, and prevents agglomeration and sintering of the reduced iron in the gasification zone. The gases developed in this zone are used as the reducing gas in the reducing zones, and the deposited carbon is partially burned with air to heat the cycled iron in the external burner. The heating of the carbon coated iron provides the heat, on recycle, necessary to carry out the endothermic cracking and reducing reactions carried out in the gasification and ferrous reducing zones, respectively. By heating and cycling iron, which is the heat carrier, from the burning zone to the gasification zone and ferrous reducing zone, the necessity and difficulties involved in separating an inert heat carrier from the reaction products is overcome. Since the heat carrier is not reoxidized, on contact with the atmosphere, due to its protective coating of carbon. This material can be removed from the reducing zone and sent to storage without further treatment.

The figure of the drawing shows a schematic diagram of the gasification zone, the reducing zones and the transfer line burner and the method by which a preferred embodiment of this invention is carried out.

The hydrocarbon fuel fed to the gasification zone which is partially oxidized and cracked to produce the reducing gases, may be normally gaseous hydrocarbons such as natural gas, methane, ethane, propane, butane or normally liquid hydrocarbons such as gasoline, naphtha, kerosenes, gas oils, light vacuum gas oils, heavy vacuum gas oils, fuel oils, diesel oils, heavy residual hydrocarbon materials and the like. The amount of fuel required to reduce a specific amount of iron ore will depend on the type of fuel that is used and ore that is reduced. Preferably, natural gas, consisting essentially of methane, and normally liquid hydrocarbons such as naphtha are used.

A portion of the carbon deposited on the reduced ore is oxidized in the external burner by contact with an oxygen-containing gas. Generally, air is preferred. Various types of iron ore may be reduced in accordance with the present invention and will consist primarily of ores containing $Fe_2O_3$ which have been pulverized to reduce them to a suitable size that can be fluidized so that the reactions can be carried out in dense fluid beds. The state of reduction of the iron in the gasification zone in which the hydrocarbons are injected is important and must be carefully controlled. This bed contains some FeO being reduced to Fe and large amounts of Fe and carbon. These materials are the catalyst for cracking the hydrocarbons and producing the reducing and fluidizing gases. The rate of carbon deposition can be controlled by controlling the ratio of oxygen to carbon in the hydrocarbon feed, fed to the gasification zone. The reaction in this zone is controlled so that between 5 to 30 wt. percent of carbon, based on reduced iron is uniformly deposited on the reduced iron. The reduced iron with a carbon coating is withdrawn as product or recycled to the external burner at such rates as to maintain the same average percentage of carbon on the iron and to maintain the correct catalyst composition to carry out the desired reduction and cracking reactions.

The pressures are generally not considered to be an important variable in the process except insofar as necessary to maintain a proper flow of solids through the system. In general, the process is operated at pressures from about atmospheric to 150 p.s.i.g. However, pressures considerably in excess of these may be employed if it is so desired. It is not intended to restrict the process of this invention to particular pressures. Also, the pressures may be varied in accordance with the reaction being carried out in a particular zone so that the gas is either oxidizing or reducing to a particular reactant as necessary.

The conditions of temperature and ratio of CO to $CO_3$ and $H_2$ to $H_2O$ in the gasification zone and in each of the reducing zones as well as in the external burner are critical and will be described in detail. These conditions are so set that the entire process is balanced as to endothermic and exothermic reactions and the necessary heat to carry out the endothermic reactions is produced in the external burner which uses as its fuel part of the carbon deposited on the reduced iron. The iron ore reduction may be carried out in one, two, or three reducing zoes or stages. This invention will be described using two reducing stages. In the first stage, the iron ore, $Fe_2O_3$, is reduced to FeO at a temperature of 1000–1800° F., though temperatures of 1100–1600° F. can also be used, and at pressures of 0–100 p.s.i.g., though pressures of 0–20 p.s.i.g. can also be used. Due to the high state of oxidation of the iron ore, reducing gases containing relatively large amounts of $CO_2$ and $H_2O$ can be efficiently utilized to reduce the $Fe_2O_3$ to FeO. In this stage the reducing gases contain a ratio of CO to $CO_2$ of 2–6 and preferably of 3–5, and of $H_2$ to $H_2O$ of 1–4 and preferably of 2–3.

The greater the degree of reduction of the iron ore, the more critical becomes the concentration of $CO_2$ and $H_2O$ in the reducing gases. In the FeO to Fe reducing zone, temperatures of 1000–1800 can be used while temperatures 1100–1600 are preferred with pressures of 0–100 p.s.i.g. and pressures and pressures of 0–20 p.s.i.g. being preferred. The ratio of CO to $CO_2$ can be 20–100, though ratios of 40–80 are preferred. The ratio of $H_2$ to $H_2O$ can be 20—100 with the ratio of 50–90 being preferred. The off gases from the second stage reduction of FeO to Fe have a considerable amount of reducing capacity and are used to reduce the $Fe_2O_3$ to FeO in the first reduction stage.

In the gasification zone, temperatures of 1400–2000° F. are used with temperatures of 1500–1800° F. being preferred. In order not to use excessive amounts of hydrocarbon fuel, the amount of carbon deposited on the reduced iron in this stage is maintained at a 10 to 30 wt. percent based on reduced iron. Preferably, by closely controlling the conditions in this stage, a percentage of 20–25 wt. percent based on weight of reduced iron can be deposited on the iron. A sufficient amount of carbon is deposited on the reduced iron in the gasification zone to provide the fuel for burning in the external heater, and to have enough remaining to prevent agglomeration and sintering of the reduced ore in the gasification zone, to maintain the reduced iron product in a non-pyrophoric state, and to protect the iron against reoxidation in the external burner. However, excessive deposition of carbon on the iron represents loss of reducing gases, increased in the amount of heat required to carry out the cracking operation, and generally a less efficient reduction and cracking step.

The reaction conditions in the gasification zone are carefully controlled so that only the minimum excess amount of carbon required is deposited on the reduced iron. The ratio of $O_2$ in the combustion gas to carbon in the hydrocarbon feed to this zone is carefully controlled so that the desired amount of carbon is deposited. This $O_2$/carbon ratio may be 0.02–0.4, but is preferably .05–0.20. By controlling the amount of $O_2$ fed to the gasification zone, there is sufficient oxygen to react with only part of the carbon resulting from cracking of the hydrocarbon so that the desired amount of residual carbon is deposited on the reduced ore. Due to carrying out this reaction in a fluidized bed, reduced ore with deposited carbon can be efficiently and continuously removed from this zone and cycled to the external burner or stored.

The major portion of the heat to carry out the reduction and cracking reactions in accordance with this process is generated in the external burner. This heat is transferred to the ferrous reducing zone and/or gasification zone as a sensible heat of the heated reduced carbon coated iron from the transfer line burner. The primary fuel to the transfer line burner is the carbon deposited on the reduced ore. Carbon when oxidized to CO and $CO_2$, generates a lot of heat. Part of the carbon cover is oxidized in the external burner generating considerable amount of heat which is absorbed as sensible heat by the carbon coated reduced iron. The off gases from the external burner are at very high temperatures and are used as preheat for the iron ore feed.

The oxidation conditions in the external burner are critical since it is desired to obtain maximum efficient burning of only a portion of the carbon cover with air to increase the temperature of the recycled iron and not oxidize the reduced iron. Back-oxidation of reduced iron is minimized since only a portion of the carbon cover is burned and the carbon remaining protects the iron and would be preferentially first oxidized under the conditions utilized in the external burner. The critical feature of the burner operation is to maintain extremely short residence time for the carbon covered particle in the burner. In the burner, the temperature is maintained at about 1700°–2500° F., though temperatures of 1800–2200 are preferred. The burner is operated at a pressure of 0–50 p.s.i.g. with pressures of 0–20 p.s.i.g. being preferred. This oxidation increases the temperature of the recycle iron by about 100–500° F., preferably the increase in temperature is 200–400° F. The residence time of the reduced iron in the transfer line burner is short, usually a period of 0.1–5.0 sec., though periods of 0.4–1.0 sec. are preferred. The solids and gases in the burner are reacted under a condition of dispersed solids phase.

The excess air in the burner is controlled at 0–20%. The preferred excess air is 0–10%. Excess air is calculated on the amount of carbon burned; total carbon present is much greater but contact time is too short to permit complete carbon burn-up.

The amount of carbon burned in the transfer line burner is 0.05–0.20 ton per ton of reduced ore, preferably 0.08–0.15 ton of carbon per ton of reduced ore. This amounts to 2 to 8 wt. percent, preferably 4 to 6 wt. percent, of the deposited carbon being burned to CO and $CO_2$. About 16 to 22 tons of heated iron particles per ton of reduced ore is recycled from the heater to the reactor.

For a 100 ton of reduced ore per day plant utilizing a three-stage reactor having an 8 ft. diameter and a 30 ft. height containing two reducing zones and a gasification zone fluid beds eight feet in height can be used. An external burner to supply the necessary heat for carrying out the endothermic reactions will be 2 feet in diameter and 30 feet in height. Suitable pumps, furnaces, heaters, cyclones to separate solids from gases, connecting downcomers and risers can be utilized in a manner conventional in the art. The number of beds used to carry out the reduction reaction does not form a critical part of the invention. The heated solids from the external burner can all be returned to the gasification zone or a portion of them can be diverted to the Fe/FeO zone. Additional hydrocarbon fuel or off gas from a reducing zone can be added to the transfer line burner to provide additional heat to the circulating iron. However, it is preferred to burn only the deposited carbon.

In accordance with a preferred embodiment of the invention, a two-stage reduction is carried out in conjunction with an external transfer line burner. Referring to the figure of the drawing, a hydrocarbon fuel such as naphtha is introduced into a preheat furnace in which it is preheated to a temperature of about 900 to 1000° F. but below the temperature at which the naphtha cracks. The preheated fuel is then fed through line 4 to the gasification zone 9 of reducing vessel 6 through a suitable liquid distribution means, together with preheated air at 1000° F. introduced through line 3. The naphtha is sprayed directly into a fluidized bed containing carbon-coated iron. The reduced iron acts as a catalyst and cracks the naphtha to elemental carbon and hydrogen, while the $O_2$ in the air partially oxidizes the hydrocarbons or hydrogens to CO and $H_2O$. Carbon monoxide may also react with the $H_2O$ to produce carbon dioxide and hydrogen and may, in addition, react with any residual FeO to produce carbon dioxide and Fe. The temperature in zone 9 is maintained at about 1500–1800° F. and the pressure of about 0.20 p.s.i.g. Air is introduced at a sufficient rate to provide the necessary amount of oxygen to the bed to produce carbon monoxide, which is needed to produce the synthesis gas. The rate of introduction of air is critical since if not enough oxygen is introduced to zone 9, the heat supplied by the external burner will not be sufficient to maintain the cracking reaction, and if too much is added carbon will not be deposited.

The rate of flow of Fe to zone 9 is controlled by a suitable valve in downcomer 22 which is not shown. The rate of withdrawal of reduced iron from zone 9 through line 24 is controlled in such a manner that residual FeO in the reduced product is satisfactorily low, usually less than 10%, and the amount of reduced iron in zone 9 is controlled so that enough carbon coating is maintained to protect the reduced iron from reoxidation in the external burner. The cracking and reactions carried out in zone 9 are highly endothermic and a large amount of heat is required to be introduced into zone 9 to maintain the reaction temperature at 1500 to 1800° F. The partially oxidized cracked product, namely, CO and $H_2$ and minor amounts of $H_2O$ and $CO_2$, provide the fluidizing gas to maintain the bed in zone 9 as a dense fluidized bed.

The fluidizing gases pass up the bed through space 10 and through fluidizing grid 7 or other suitable gas distributor and are introduced into bed 11 where the gases fluidize the Fe in this bed, maintaining it as a dense fluidized bed. In this bed the fluidizing gases reduce the FeO to Fe. FeO is continuously introduced from the $Fe_2O_3$ bed 13 by downcomer 21. The rate of introduction of FeO to bed 11 is controlled by a suitable valve, not shown. In bed 11 the carbon monoxide and $H_2$ in the reducing gases are partially oxidized to $CO_2$ and $H_2O$ while reducing the FeO to Fe. Bed 11 is maintained at a temperature of 1100–1600° F. and at a pressure of 0–20 p.s.i.g. and the ratio of CO to $CO_2$ in this bed is 3–5 and of $H_2$ to $H_2O$ in this bed is 2–3. Only a small part of the CO and $H_2$ from zone 9 introduced into bed 11 is oxidized to $CO_2$ and $H_2O$. There is a considerable amount of CO and $H_2$ remaining in this gas which flows into gas space 12 and is fed through fluidizing grid 51 to bed 13 wherein it reduces the $Fe_2O_3$ to FeO in that bed.

Transfer line burner 5 represents a preferred means of providing the heat to zone 9 and bed 11 to carry out the endothermic reduction in bed 11 and the endothermic cracking reactions in bed 9. In zone 9 cracking and partial oxidation of the cracked products is carefully controlled so that the amount of carbon deposited on the reduced iron withdrawn through line 24 is maintained at a value of about 20–25 wt. percent based on iron and as this average amount of carbon is deposited on the reduced iron, the iron is withdrawn. Part of the carbon coated iron is withdrawn through line 24 and is the product of this process. The carbon coating on the iron renders it non-pyrophoric when exposed to the atmosphere and easier to handle. The remainder of the carbon coated iron is cycled through lines 24, 25, and 43 to transfer line burner 5. The combustion air for the burner is preheated to a temperature of about 900 to 1000° F. The air picks up carbon coated reduced iron from line 25 and carries it through riser 43 into transfer line burner 5. In burner 5, the carbon is oxidized by the preheated air to CO and $CO_2$ increasing the temperature of the carbon coated iron particles by about 200–400° F. The transfer line burner is operated at a temperature of about 1800–2200° F. and a pressure of about 0–20 p.s.i.g. Residence time of the carbon coated iron particles in a transfer line burner is about 0.4–1.0 sec.

In a preferred embodiment of the reduced iron particles are coated with 10 to 30% by wt. carbon based on iron. The amount of carbon coating is critical in that if an excessive amount of carbon is present, it represents a loss in fuel efficiency and in the amount of reducing gases produced. Whereas, if the carbon coating is too little, there is not sufficient carbon coating to provide fuel for the burner and to protect the iron from being back-oxidized in the transfer line burner. The excess oxygen in the transfer line burner is about 0–10%. A sufficient excess of air is added to the transfer line burner to impart to the carbon coated reduced iron particles sufficient amount of sensible heat to provide the heat necessary for zone 9 and bed 11. The thus heated carbon coated reduced iron particles are circulated at a sufficient rate to transmit this heat to zone 9 and bed 11. The amount of heating in burner 5 and the amount of recycle can be adjusted to provide the necessary heat to carry out the desired cracking and reduction reactions in zone 9 and bed 11. The overhead gases from transfer line burner 5 at a temperature of 1800 to 2200° F. are taken together with the heated reduced iron particles and are withdrawn through line 32 and introduced to cyclone separator 28. These off gases are at a very high temperature. Cyclone separator 28 separates the solids and feeds them through line 29 and 45 and 46 back to zone 9 and 11 wherein the hot iron particles provide the necessary heat for carrying out the endothermic reactions. The separated overhead gases are taken through line 27 and are used to preheat the ore feed.

Iron ore feed at about 77° F. is introduced through line 19 into cyclone heater 16 when the ore is directly contacted with the hot off gases from transfer line burner 5 introduced through line 27 and the ore is preheated to a temperature of 1000–1600° F. Preheated ore is introduced through line 20 into bed 13. The partially cooled off gases are removed from preheat cyclone 16 through line 17 and may be used by indirect heat exchange to heat other process streams. The $Fe_2O_3$ is reduced in bed 13 to FeO. The heat to carry out the reduction is provided primarly by the sensible heat of the reducing gas from bed 11, but may be supplemented by air injection through line 54 which increases the temperature by burning part of the reducing gas. The temperature of bed 13 is about 1100–1600° F. and the pressure is about 0–20 p.s.i.g. The ratio of CO to $CO_2$ is 0.3–1.6 and of $H_2$ to $H_2O$ is 0.2–2.5. The reduced FeO is withdrawn from bed 13 and introduced into bed 11 by downcomer 21 as previously described.

The off gases removed from space 53 by line 52 have a considerable amount of heat remaining in them and can be used for heat exchange to heat process streams. These gases would normally also be used as a fuel. Alternately, these gases can be subjected to cooling and condensation to remove $H_2O$ and treated to remove $CO_2$ and recycled to either bed 9 or 11 to provide additional reducing gases.

The above description represents a preferred embodiment of the present invention. Various pumps, valves, cyclone separators, furnaces and heat exchange equipments have been omitted for purposes of simplicity but would be utilized in a manner known to the art.

The recycle of the carbon coated iron is capable of internal elimination of any sulfur present as FeS that may be formed as a result of using a sulfur containing hydrocarbon fuel for gasification. On gasification of the hydrocarbon the sulfur is released and adsorbed by the reduced iron forming FeS in the gasification zone which is cycled to the external transfer line burner. In the burner the iron releases the sulfur as $H_2S$. The Fe is returned to the reactor. The $H_2S$ is removed from the system with the combustion products obtained in the transfer line burner. Sulfur-free reduced iron can be obtained by withdrawing product from the final reduction zone 11 through line 44. In cases where sulfur is not a major problem carbon coated sulfur-free reduced iron can be obtained by withdrawing the product from the gasification zone 9 through line 24.

In accordance with this invention where the processes are carried out in such a manner that the reduced iron product is coated with 10 to 30 wt. percent carbon, the carbon coated reduced iron may be easily handled and stored since in this condition it is non-pyrophoric, or may be fed directly to a furnace and melted. This material makes an ideal synthetic scrap and may be used as scrap in conventional steel making processes wherein the carbon coating is burned as a fuel to assist in melting the iron.

The invention is further illustrated by the following example.

*Example I*

A $C_5$ to $C_6$ light naphtha feed boiling in a range of about 120–180° F. is preheated to a temperature of about 980° F. and introduced into a gasification zone containing metallic iron and carbon. The light naphtha is introduced to the gasification zone at a rate of about 1200 pounds per ton of reduced iron ore product, together with 12–14 s.c.f. of air per pound of naphtha. The gasification zone is operated at a temperature of about 1600° F. and a pressure of about 10 p.s.i.g. Under these conditions, the naphtha feed is partially oxidized to CO, $CO_2$ and $H_2O$ and cracked to hydrogen and elemental carbon. The elemental carbon reacts with the oxygen in the air to form carbon monixide and the hydrogen reacts with the oxygen either in the carbon dioxide or in the air to form $H_2O$. The $H_2O$ may again react with CO to form $CO_2$ and hydrogen. These reactions take place simultaneously and the amount or degree to which each of the products are present will depend on the reaction conditions. The ratio of $O_2$ to C in the light naphtha feed is about 0.1. The gasification reaction is carried out so that about 24 wt. percent carbon is deposited on the reduced ore. 1,640,000 B.t.u.'s are required in the gasification zone per ton of reduced iron ore product and 980,000 B.t.u.'s are required in the ferrous reduction zone (FeO to Fe) to carry out the reduction reaction in that zone. The off gases from the gasification zone are removed at a temperature of about 1600° and are introduced into the ferrous reduction zone. The temperature in the ferrous reduction zone is about 1600° and the pressure is 6 p.s.i.g. The hot gases from the gasification zone, together with the hot FeO from the ferric zone and hot solids from the burner, provide the necessary B.t.u.'s to carry out the FeO reduction to Fe. Off gases from FeO reduction zone are withdrawn at a temperature of about 1600° F. and are fed to the ferric reduction zone wherein they are oxidized by the $Fe_2O_3$ while reducing the $Fe_2O_3$ to $Fe_3O_4$ and FeO. Additional heat can be added to this zone by air injection which oxidizes part of the reducing gas. 320 pounds of carbon on the coated reduced iron are burned in the transfer line burner by 54,000 s.c.f. of preheated air per ton of reduced ore product and about 19 tons of reduced iron particles per ton of reduced ore are recycled. In the transfer line burner about 4.4% of the carbon cover is oxidized to $CO_2$. In the transfer line burner the carbon coated reduced iron is increased in temperature by about 300° F. The residence time of the iron ore in the transfer line burner is about 0.5 sec. The off gases from the transfer line burner contain $CO_2$ and nitrogen at a very high temperature and are used to preheat the ore feed. These gases are at a temperature of about 2000° F. and preheat the ore feed to a temperature of about 1000° F. The hot gases containing the entrained hot reduced ore from the transfer line burner are introduced to a cyclone separator where the gases are separated from the iron ore. The hot solids are cycled back to the ferrous reduction zone and the gasification zone at a recycle rate of about 19 tons per ton of reduced ore produced.

The above described process has overcome many of the shortcomings of the prior known processes for carrying out reduction of iron ore by direct injection of hydrocarbons in a fluid bed. It is to be submitted, however, that the transfer line burner principle may be used in other direct iron ore reduction processes. The principal feature of the present invention is in withdrawing a reduced carbon covered iron from the gasification zone, heating it in an external heating zone, recycling the reduced heated iron back to the gasification zone and/or ferrous reducing zone to provide the large amount of heat necessary for the endothermic cracking and reducing reactions. This technique solves the problem of introducing heat to the gasification and reducing zones, overcomes the problem and difficulty of separating inert heat carrier particles from product, which inert particles heretofore have been used to transfer heat to a reaction zone.

Variations to adjust for different hydrocarbon feeds and different iron ore feeds as well as variations obvious to those skilled in the art are all intended to come within

What is claimed is:

1. A process of directly reducing iron oxides to metallic iron solid particles by contacting said oxides within a reducing zone with reducing gases, wherein the reducing reaction is endothermic requiring added heat, which comprises removing from the reducing zone a portion of the reduced iron solid particles, circulating the particles to an external heating zone, heating the reduced iron particles to a more elevated temperature, and recycling the heated solid iron particles to the reducing zone, thus adding heat to the iron reducing zone in sufficient quantities to carry out the desired reduction reaction.

2. The process of claim 1 wherein the rate of recycle of the reduced iron solid particles to the external heating zone and back to the reducing zone is sufficient to provide a residence time for the particles of from about 0.1 to 5.0 seconds and the temperature within the external heating zone ranges from about 1700° F. to 2500° F.

3. The process of claim 1 wherein hydrocarbon fuel is injected directly into a gasification zone wherein it is cracked and the cracked products react to produce reducing gases which reduce the iron oxide to metallic iron.

4. A process for the production of iron from iron ore comprising endothermically cracking and partially oxidizing a hydrocarbon fuel in a gasification zone and simultaneously endothermically reducing iron oxides to metallic iron under conditions wherein carbon and hydrogen are produced and the carbon uniformly deposited on the metallic iron solid particles, withdrawing a part of the carbon covered iron particles and cycling same to an external heating zone and therein contacting the said particles with an oxygencontaining gas and exothermically oxidizing a portion of the carbon to heat the carbon covered reduced iron particles, recycling the heated particles to the gasification and reducing zone to provide the necessary sensible heat to the particles to carry out said endothermic reactions.

5. A process for the production of iron from iron ore wherein the latter is suspended at elevated temperature as a dense fluidized bed of iron oxide solid particles, which comprises (1) feeding into the bed a hydrocarbon fuel and gasifying same with the molecular oxygen from the iron oxides to produce iron, lower oxides of iron and oxidation products including hydrogen and carbon, said carbon produced being deposited substantially uniformly on said reduced iron, (2) generating in said gasification reaction $CO$ and $H_2$ and then contacting said gases with iron oxides in a ferrous reducing zone to endothermically reduce said oxides to metallic iron solid particles while simultaneously partially oxidizing said reducing gas, (3) withdrawing from said ferrous reducing zone a portion of the carbon coated reduced iron particles and circulating same to an external burner zone and therein contacting said particles with an oxygen-containing gas to exothermically burn the carbon of said iron particles to heat same thus increasing the temperature of said particles above that of the gasification and reducing zones, and then (4) recycling the heated reduced iron solid particles from the burner to said zones to provides the necessary heat to carry out the endothermic reactions.

6. The process of claim 5 wherein the combustion gases produced in the transfer line burner are contacted with iron ore feed in a preheat cyclone and the ore is preheated prior to being reduced.

7. The process of claim 5 wherein preheated iron ore is fed to a ferric reducing zone where it is reduced to ferrous oxide and is then fed to a ferrous reduction zone where it is reduced to metallic iron, and is subsequently fed to a gasification zone where it functions as a gasification catalyst.

8. A direct reduction process for reducing iron oxides to metallic iron which comprises (1) gasifying a hydrocarbon fuel in a gasification zone at elevated temperature with an oxygen-containing gas, wherein the ratio of oxygen in the gas to carbon in the hydrocarbon is .02 to 0.4, to produce hydrogen and carbon and oxidation products of hydrogen and carbon, said gasification reaction being carried out in a dense fluidized bed of reduced iron particles, said carbon produced by said gasification reaction being deposited uniformly on said reduced iron, (2) withdrawing the gases from said gasification zone comprising large amounts of $CO$ and $H_2$ which are reducing in nature to iron oxides and passing same to a ferrous reducing zone wherein is contained a fluidized bed of ferrous oxides, and therein contacting the ferrous oxides with said reducing gas to endothermically reduce the ferrous oxides to metallic iron while simultaneously partially oxidizing said reducing gas, and then passing to a fluidized bed of ferric oxides and contacting same with the gas to reduce the ferric oxides to ferrous oxides, while flowing the iron solid particles in each of said fluidized beds from the ferric oxide zone to the ferrous oxide zone and thence to the gasification zone, (3) withdrawing a portion of the carbon coated reduced iron particles from said gasification zone and cycling the particles to an external burner and contacting same with an oxygen-containing gas to exothermically burn some of the carbon coating of the particles to $CO$ and $CO_2$ this generating a large amount of heat, providing a residence time of said particles within said burner of from about 0.1 to 5.0 sec. so that heat is adsorbed as sensible heat by the carbon coated reduced iron particles to increase their temperature above the temperature of said gasification and reducing reaction zones, and then (4) recycling the heated reduced iron particles from the burner to said ferrous reducing zone and thence to said gasification zone to provide the necessary heat to carry out the endothermic reactions.

9. The process of claim 8 wherein the amount of carbon deposited on the reduced ore is increased by about 2 to 8% in the gasification zone.

10. The process of claim 8 wherein 100 to 400 lbs. of carbon per ton of reduced iron produced are burned in the burner.

11. The process of claim 8 wherein 16 to 22 tons of heated carbon coated reduced iron particles per ton of reduced iron product are cycled to the burner and recycled to the gasification and ferrous reducing zones to provide the necessary heat to carry out the reactions in said zones.

12. The process of claim 8 wherein said particles circulated to said transfer line burner are raised in temperature by 100 to 500° F. by burning from said particles 2 to 8% of the deposited carbon per pass in said burner.

13. The process of claim 8 where up to 20% excess air over than required to burn the amount of carbon actually burned in the burner is fed to the burner.

14. A direct reduction process for reducing iron oxides to metallic iron which comprises (1) gasifying a hydrocarbon fuel in a gasification zone at elevated temperature with an oxygen-containing gas wherein the ratio of oxygen in the gas to carbon in the hydrocarbon is .05 to 0.20 to produce hydrogen and carbon and oxidation products of hydrogen and carbon, said gasification reaction being carried out in a dense fluidized bed of reduced iron particles, depositing 10 to 30 wt. percent of said carbon based on weight of iron produced by said gasification reaction uniformly on said reduced iron, (2) withdrawing the gases from said gasification zone comprising large amounts of $CO$ and $H_2$ which are reducing in nature to iron oxides and passing same to a ferrous reducing zone wherein is contained a fluidized bed of ferrous oxides, and therein contacting the oxides with said reducing gas to endothermically reduce the ferrous oxides to metallic iron while simultaneously partially oxidizing said reducing gas, and then passing the reducing gases to a fluidized bed of ferric oxides and contacting same with the gas to reduce the ferric oxide to ferrous oxide, while flowing the iron solids particles in each of said fluidized beds from the ferric oxide zone to the ferrous oxide zone and thence to the gasification zone, (3) withdrawing a portion of the carbon coated reduced iron particles from said gasification zone and cycling the particles to an external transfer line burner and contacting same with a preheated oxygen-containing gas to endothermically burn from about 2 to 8% of the carbon coating deposited on the iron to produce CO and $CO_2$ this generating a large amount of heat, providing a residence time of said particles within said burner of from about 0.4 to 1.0 sec. so that heat is adsorbed as sensible heat by the carbon coated reduced iron particles to increase the temperature of the particles by 100° to 500° F. above the temperature of said gasification and reducing reaction zones, (4) recycling the thus heated reduced iron particles from the transfer line burner to said ferrous reducing zone and to said gasification zone to provide the necessary heat to carry out the endothermic reactions.

15. The process of claim 14 wherein the temperatures in the ferric and ferrous reducing zones are maintained between 1100 to 1600° F., in the gasification zone between 1500 to 1800° F. and in the burner between 1800 to 2200° F.

References Cited by the Examiner

UNITED STATES PATENTS

| | | | |
|---|---|---|---|
| 2,475,607 | 7/49 | Garbo | 75—26 |
| 2,790,710 | 4/57 | Cavanagh | 75—34 |
| 2,877,106 | 3/59 | Aspegren | 75—34 |
| 2,990,269 | 6/61 | Hyde | 75—34 X |
| 3,079,248 | 2/63 | Lewis | 75—26 |

DAVID L. RECK, *Primary Examiner.*